United States Patent Office 3,132,669
Patented May 12, 1964

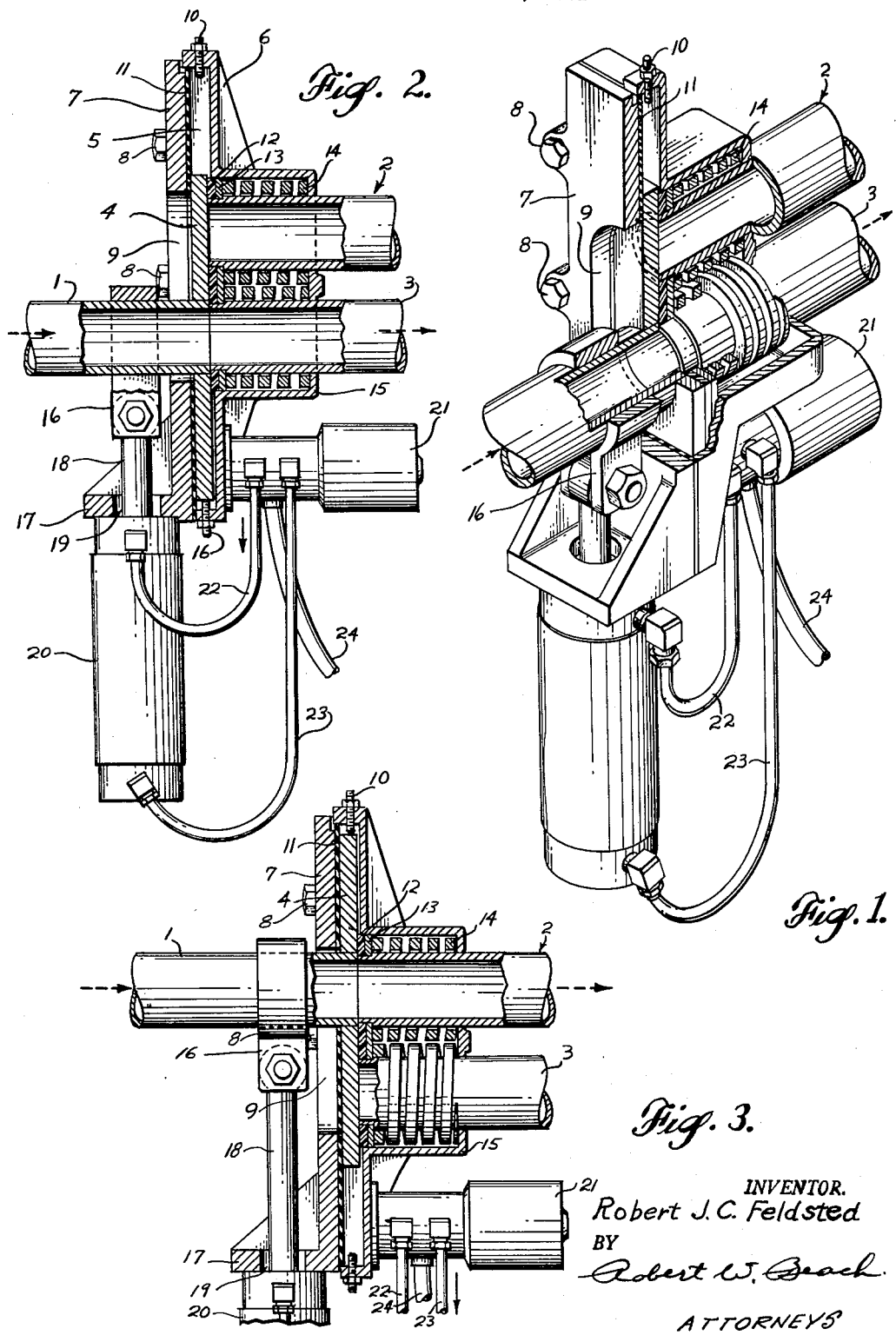

3,132,669
PIPE CONVEYOR DIVERSION VALVE
Robert J. C. Feldsted, Seattle, Wash., assignor, by mesne assignments, to Granu-Flow Equipment Ltd., Vancouver, British Columbia, Canada, a corporation of British Columbia, Canada
Filed Mar. 13, 1961, Ser. No. 95,298
3 Claims. (Cl. 137—625.48)

This invention relates to a diversion valve for a pipe conveyor intended primarily for conveying fine granular material which is airborne. The purpose of such a valve is to divert the flow of material from a supply pipe into a selected one of a plurality of receiving pipes. Such receiving pipes may be connected respectively to different storage bins or processing devices.

The principal object of the invention is to provide a diversion valve structure which will maintain substantially straight and unrestricted flow through the valve structure irrespective of which receiving pipe the supply pipe communicates with, and which valve structure will maintain a tight seal between the supply pipe and the particular receiving pipe with which it communicates without the valve structure being required to be constructed to close tolerances. Moreover, the fit of cooperating parts of the valve will not be adversely affected even by great changes in temperature.

A further important object is to provide a diversion valve construction which can be manipulated quickly to change communication of the supply pipe from one receiving pipe to another receiving pipe so that it is unnecessary to interrupt the flow of material into the supply pipe during the transition of connecting it to a different receiving pipe, and during such transition the material will not pack appreciably in the supply pipe nor can it escape from the valve structure during such transition.

A further object is to provide an arrangement for closing a receiving pipe other than the one with which the supply pipe is in communication so that it will be protected from contamination by dust and dirt.

It is also an object to provide actuating mechanism for the diversion valve which can be remotely controlled to enable the communication of the supply pipe to be altered from a location adjacent to the discharge end of a receiving pipe or from a control station from which various diversion valves in a conveying system can be controlled.

A diversion valve structure capable of accomplishing the foregoing objects can be compact, include few parts and be made of rugged construction so that it will be reliable in operation and require a minimum of maintenance and repair.

In general, a diversion valve structure embodying the present invention may include a slide connected to the shiftable discharge end of a supply pipe. Such slide is received loosely in a recess, opposite sides of which form guideways for the slide, with which recess a plurality of receiving pipes communicate and these pipes are spring pressed toward the slide, so that the receiving end of each receiving pipe is either closed by the slide or is in communication with the discharge end of the supply pipe. An actuator is provided to shift the discharge end of the supply pipe conjointly with the slide to place the supply pipe in communication with different receiving pipes.

FIGURE 1 is a top perspective view of a representative diversion valve with parts broken away.

FIGURE 2 is a central section through the diversion valve mechanism showing parts in one operative position, and FIGURE 3 is a generally similar view with parts shown in a different operative position.

While a diversion valve utilizing the principles of the present invention could be designed to connect a supply pipe to any one of several receiving pipes, the specific form of diversion valve shown in the drawings and described hereafter is arranged to connect the discharge end of a supply pipe 1 to the receiving end of either of two receiving pipes 2 and 3. For purposes of illustration, it is assumed that the valve mechanism is mounted in stationary condition, that the receiving pipes 2 and 3 are mounted for lengthwise movement at least to a limited degree and that the discharge end portion of the supply pipe 1 is suitably supported so that it can be shifted transversely of its length at least in a direction parallel to a selected plane.

The diversion valve mechanism of the present invention is particularly adapted for pipe conveyor systems for conveying fine granular material by a flow of air and such granular material may be composed of very fine particles such as cement or flour, or may be composed of coarser particles such as grain or sawdust. In the design of such a diversion valve structure it is important that the valve structure be sealed against escape of the material being conveyed, both to prevent loss of material and pollution of the air, and also to prevent accumulation of material between working parts of the valve structure which might tend to pack between moving parts and cause them to jam. A similar type of valve structure could be used for a piping system for liquid such as water, or for gas such as steam, but such pipe systems usually operate under considerable pressure and it is more difficult to prevent leakage of a gas or liquid than it is of airborne granular material, so that the design requirements would be higher for a valve to be used in such a system than the usually intended uses of the present valve.

In the structure of the present diversion valve, the discharge end portion of the supply pipe 1 and the receiving end portions of all the receiving pipes, such as pipes 2 and 3 shown in the drawings, are arranged with their axes coplaner and preferably substantially parallel. The ends of all these pipes are then disposed in planes perpendicular to their respective axes. A slide 4 is located adjacent to these pipe ends and is apertured to receive extending through it the end of the supply pipe 1. Such slide preferably is in the form of a flat plate and should be secured to and carried by the end of pipe 1 in position such that the pipe end is flush with the surface of the slide plate facing downstream in the direction of flow through the supply pipe.

The slide 4 is received in a recess or cavity 5 in one side of the valve body 6 the opposite sides of which recess, extending parallel to the plane of the axes of the end portions of pipes 2 and 3, constitute guideways for such slide. The recess is closed over most of its area by a cover plate 7 secured to the body 6 by bolts 8 and constituting guide means for the slide 4. Such cover plate has through it a slot 9 of a width slightly greater than the diameter of pipe 1 and the longitudinal axis of such slot is in the same plane as the axes of the pipes 1, 2 and 3. The width of the cavity 5 as shown in FIGURE 1 is just slightly greater than the width of the slide 4 so as to receive such slide reasonably snugly to provide an easy sliding fit, although the tolerance between the slide and the cavity is not critical. An adjustable bolt 10 having a lock nut is screwed into a tapped hole in the body 6 at each end of the cavity 5, which bolts are adjustable to limit the movement of the slide 4 in opposite directions. Where there are only two receiving pipes 2 and 3, the stop bolt in the end of the cavity 5 adjacent to the pipe 2 will be located to stop the slide so that the discharge end of the supply pipe 1 will be in precise registry with the receiving end of the receiving pipe 2, as shown in FIGURE 3. The stop bolt 10 in the opposite end of the cavity 5 adjacent to the receiving pipe 3 will stop the movement of the slide 4 so that the discharge end of the supply pipe 1 is in precise registry with the receiving end of the receiving pipe 3, as shown in FIGURE 2.

It will be seen that the length of the plate slide 4 at each side of the pipe 1 in the direction of slide movement is greater than the distance between the axes of the receiving pipes 2 and 3. When the discharge end of the supply pipe 1 is in registry with the receiving end of the receiving pipe 3, as shown in FIGURE 2, therefore, a portion of the slide 4 at the side of pipe 1 adjacent to pipe 2 will cover the end of such pipe. On the other hand, when the discharge end of the supply pipe 1 is in registry with the receiving end of the receiving pipe 2, as shown in FIGURE 3, part of the slide 4 at the side of pipe 1 adjacent to pipe 3 will cover the end of such pipe. Moreover, as soon as the discharge end of pipe 1 begins to move out of registry with an end of one of the receiving pipes, a portion of the slide adjacent to the discharge end of the supply pipe 1 will begin to move over such receiving pipe end to close it progressively. Consequently, the ends of both discharge pipes 2 and 3 will be covered at all times either by the slide 4 or by the end of the supply pipe 1, or by a combination of these elements.

In order to facilitate sliding of the slide 4 in the cavity 5, it is preferred that the contacting surfaces of the slide and the cover plate 7 be made of different materials. The slide 4 can be metal and the inner surface of the cover plate 7 can be covered with a lining or facing of Teflon plastic which has a very low coefficient of friction. Alternatively, of course, the cover plate 7 could be made of metal alone and the Teflon facing could be applied to the contacting side of the slide. It is preferred that the opposite face of the slide also be engaged by a Teflon surface because of its low friction characteristics and such opposite side of the slide is engaged by the Teflon lining or facing 12 on pressure plate 13. This pressure plate is apertured to receive through it the receiving ends of the two pipes 2 and 3. Such apertures may, if desired, be somewhat smaller than the exteriors of these pipes and the ends of such pipes can be reduced slightly as shown to form shoulders engaging the side of pressure plate 13 opposite slide 4. The reduced portions of these pipes are sufficiently long axially so that the ends of the pipes are flush with the exposed surface of the Teflon lining 12 which engages the slide 4.

Pressure is exerted on the pressure plate 13 by compression springs 14 encircling the pipes 2 and 3, respectively, rather closely and bearing on the pressure plate. Such pressure on this plate presses the Teflon lining 12 against the slide 4 and in turn presses this slide against the lining 11 on the inner side of cover plate 7, so that the slide will be clamped firmly and prevented from being tilted while at the same time being readily slidable between the two Teflon linings 11 and 12. The casing 6 has a projection 15 forming a deep cavity surrounding the ends of the receiving pipes 2 and 3 which communicates with the shallow cavity 5 in which the slide 4 is fitted. Such deep cavity 15 receives in it the compression springs 14 which bear against the casing at the bottom of such deep cavity. These springs act not only to press the lining 12 against slide 4 and such slide against the cover 7, but, because the ends of tubes 2 and 3 are flush with the side of the pressure plate structure adjacent to slide 4 and the end of pipe 1 is flush with the side of slide 4 adjacent to the pressure plate structure, such springs will maintain the end of a receiving pipe and the end of the supply pipe in close abutment so as to prevent leakage of material from the pipes at the junction between the supply pipe and such receiving pipe.

Since the supply pipe 1 and the slide 4 are secured together force may be applied to either of them to effect movement of the slide and shifting of the supply pipe end from a position in registry with one receiving pipe into a position in registry with another receiving pipe.

Such pipe shifting mechanism may include a clamp band 16 embracing the end portion of supply pipe 1 adjacent to the valve casing, which band is secured to an actuator. In the forms shown in FIGURES 1, 2 and 3, the actuator is of the double-acting pneumatic piston-and-cylinder type mounted on a flange 17 of the valve casing. The plunger rod 18 projecting through an aperture 19 in this flange from the cylinder 20 is connected to the clamp 16 for shifting it. Retraction of the actuator's plunger will move the supply pipe 1 into the position shown in FIGURE 2 in registry with the receiving pipe 3, whereas extension of the actuator's plunger will shift the end portion of the supply pipe with slide 4 into registry with the receiving pipe 2. It will be evident that the axis of the actuator is in the same plane as the axes of pipes 1, 2 and 3, and the plunger 18 moves in a direction parallel to such plane and perpendicular to the axes of the pipe end portions.

Operation of the pneumatic actuators 18, 20 is controlled by a solenoid valve 21 which is connected to opposite ends of the actuator cylinder 20 by air tubes 22 and 23, respectively. The solenoid valve can be arranged so that when its solenoid is deenergized the supply pipe 1 will be in registry with one receiving pipe, and when the solenoid is energized the valve will be shifted to reverse the supply and exhaust connections for air to the cylinder 20 so that the discharge end of the supply pipe 1 will be shifted into registry with the other receiving pipe end. If more than two receiving pipes were arranged in a row, a pneumatic actuator having a longer stroke could be used and intermediate stops operated by solenoids could be employed in conjunction with the solenoid valve 21 to locate the end portion of supply pipe 1 in registry with any one of several receiving pipes. Air can be supplied to the solenoid valve through a tube 24 connected to a source of air under pressure and the solenoid of the valve can be electrically connected in any suitable control circuit, either energized from a station close to the diversion valve, or operated from a remote control station.

It will be evident that as long as the solenoid of valve 21 is deenergized the discharge end of the supply pipe 1 will be in registry with one predetermined receiving pipe. When it is desired to shift the end of the supply pipe into registry with another receiving pipe, it is only necessary to energize the solenoid of valve 21 without cutting off or altering the flow of material into the supply pipe 1. Shifting of the valve 21 will effect abrupt reciprocation of the actuator plunger 18 to shift the end of pipe 1 and slide 4 quickly to place such pipe in communication with another receiving pipe. This action occurs so rapidly that no objectionable accumulation or packing of material in pipe 1 will occur during the transition and as soon as the transition is completed the end of the first receiving pipe will be covered by the slide 4 and the entire flow of material from the supply pipe 1 will have been diverted into the other receiving pipe with which the supply pipe is now in registry. Precise location of the supply pipe in its new position will, of course, be effected by engagement of the slide 4 with a stop bolt to limit travel of the slide to the desired position.

I claim as my invention:

1. Diversion valve mechanism comprising a supply pipe, two receiving pipes adjacent to the discharge end portion of said supply pipe, means supporting said two receiving pipes with their receiving end portions closely adjacent and with the axes of such receiving end portions in parallel coplanar relationship, including a sealing member apertured to receive the receiving end portions of said two receiving pipes and including guideways extending parallel to the plane of the axes of the receiving pipe end portions, a slide secured to the discharge end portion of said supply pipe, extending transversely beyond opposite sides thereof a distance at least as great as the spacing between the axes of the receiving end portions of said receiving pipes, engaged in said guideways and having its surface adjacent to the receiving pipe end engaged with said sealing member, resilient means pressing said sealing member against said slide for effecting sealing engagement thereof, and shifting means operatively connected to said slide and operable to shift it between a position in which the discharge end of said supply pipe is disposed in registry with the receiving end of one of said receiving pipes and the portion of the slide at one side of the supply pipe discharge end closes the receiving end of the other receiving pipe and a position in which the discharge end of said supply pipe is disposed in registry with the receiving end of the other receiving pipe and the portion of the slide at the opposite side of the supply pipe discharge end closes the receiving end of the receiving pipe previously in registry with the discharge end of said supply pipe.

2. Diversion valve mechanism comprising two receiving pipes, a sealing plate having therein apertures in which the receiving end portions of said two receiving pipes are fitted, a supply pipe, a supply pipe supporting plate secured to the discharge end portion of said supply pipes, disposed in face-to-face engagement with said sealing plate and extending transversely beyond opposite sides of said supply pipe a distance at least as great as the spacing between the axes of the portions of said two receiving pipes fitted in said sealing plate, guide means guiding said sealing plate and said supply pipe supporting plate for relative movement between positions in which the discharge end of said supply pipe is disposed in registry with the receiving end of one said receiving pipes and a position in which the discharge end of said supply pipe is disposed in registry with the receiving end of the other receiving pipe, and spring means urging said sealing plate and said supply pipe supporting plate into face-to-face engagement.

3. The diversion valve mechanism defined in claim 2, in which the spring means are helical compression springs encircling the end portions of the respective receiving pipes and urging the sealing plate into face-to-face engagement with the supply pipe supporting plate.

References Cited in the file of this patent

UNITED STATES PATENTS

| 607,265 | McLean | July 12, 1898 |
| 1,607,827 | Herrmann | Nov. 23, 1926 |
| 2,586,144 | Benoit | Feb. 19, 1952 |
| 2,776,104 | Sinkler | Jan. 1, 1957 |
| 2,858,851 | Holl | Nov. 4, 1958 |
| 2,950,081 | Steinbuch | Aug. 23, 1960 |

FOREIGN PATENTS

| 1,137,070 | France | Jan. 7, 1957 |